UNITED STATES PATENT OFFICE.

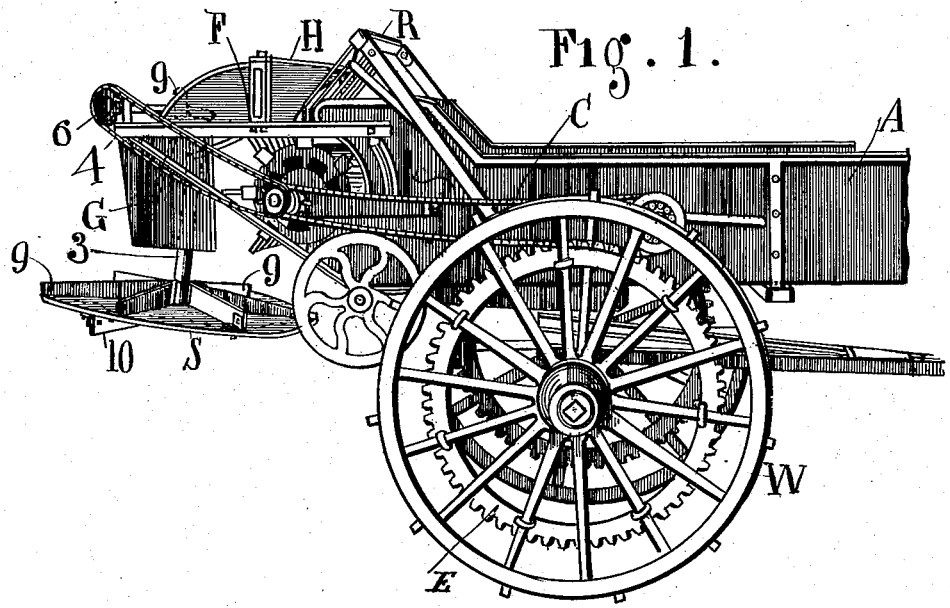

GLEN G. GRISWOLD, OF MADISON, OHIO.

CENTRIFUGAL SPREADER.

No. 921,101.　　　　Specification of Letters Patent.　　　Patented May 11, 1909.

Application filed November 29, 1907. Serial No. 404,258.

*To all whom it may concern:*

Be it known that I, GLEN G. GRISWOLD, a citizen of the United States, residing at Madison, in the county of Lake and State of Ohio, have invented certain new and useful Improvements in Centrifugal Spreaders, and do declare that the following is a full, clear, and exact description of the invention, which will enable others skilled in the art to which it appertains to make and use the same.

My invention relates to a fertilizer spreader of the centrifugal type, and is an improvement upon the spreader patented to me in the United States June 11, 1907 and numbered 856,632.

The present construction is adapted to spread manure, lime, ashes, compost, nitrate of soda, and fertilizers and fertilizing compounds generally, and embodies certain material improvements over the original machine patented as above set forth, as will fully appear in the description and drawings.

Figure 1 is a perspective elevation of the rear part of a manure spreading wagon containing my invention as an attachment thereto, and Fig. 2 is a rear elevation thereof omitting certain non-essential parts of the wagon. Fig. 3 is a vertical sectional elevation of Fig. 2 front to rear, and Fig. 4 is a plan view of the spreader.

As thus shown, the wagon body is indicated by A and the revolving beater by D, and said beater is driven initially from gear E on rear wheel W and suitable transmitting connections thence to the beater shaft by sprocket chain C and sprocket wheel 2 on the shaft 5 of said beater.

The spreader S is arranged centrally behind and on a plane somewhat beneath the body A of the wagon and has a width equal to about two thirds or three fourths and is one of the members of the attachment comprising my invention. The shaft 3 of the said spreader is preferably somewhat inclined to a vertical axis so as to throw the front of the spreader a little lower than its rear. Power is conveyed thereto by sprocket chain 4 from shaft 5 of the beater to a countershaft 6 and upon which there is a bevel gear 7 meshing with a bevel gear 8 on the upper end of spreader shaft 3. Said shaft 3 is suspended at the top from a suitable frame work F which is rigidly fixed to the wagon body and extends rearward a sufficient distance to support the spreader and other parts as the several views clearly disclose. The spreader S is shown in this instance as being of a flat disk pattern provided with a series of vanes or blades 9 upon one side, and two vanes 10 on the other, so that the spreader is reversible and either side can be used according to the fertilizer to be distributed. Furthermore, the said vanes are flexible and adjustable, and to this end said blades are permanently fixed at their inner ends and adjustable at their outer ends in a series of holes 12 arranged in the arc of a circle. Each blade has a perforated ear 13 adapted to receive a pin or bolt to fasten in holes 12, and in such adjustment the blades flex or curve more or less and change their throw accordingly. That is, if the back or convex side be used for distribution, I obtain a quick and relatively short throw, but if the direction of rotation be reversed and the concave side of the blade be used, the throw will be proportionately increased and distribution of the fertilizer will be over a larger area according to the measure of curvature. The same adjustment is provided for blades 10.

Now, having reference to the patent aforesaid, it will be observed that in said patent I employed a chute which extended from the beater B on converging lines down to the distributing disk, and that the said chute was considerably narrowed at its bottom as compared with its top or middle. It followed that there was constant danger of clogging in the chute, especially with manure, which in any case would be objectionable and hence condemn the machine. I have improved upon the said construction by entirely omitting the chute as such, and substituting a hood H of sheet metal bent lengthwise to segmental shape and extending full length over and behind the beater to intercept the fertilizer and direct it downward and so as to throw the fertilizer across the axis 3 of the distributer and onto the outer higher portion of the spreader, and since the beater turns from the bottom upward on the inside as indicated by arrow *b*, Fig. 3, the fertilizer is first thrown against the rake R, and then against hood H. Said rake has a series of teeth 15 corresponding more or less with beater teeth 16 but longer and flexible, and after the fertilizer passes the said teeth 15, which help further to brake it up, it is thrown against the hood H and then drops freely down upon the distributer, falling for the most part at the center and outer portion thereof about as indicated by arrow *a*. In connection with hood H I employ a pair of side guide or guard plates G, which are arranged at somewhat of an inward inclination from the ends of hood H to cause the fertilizer thrown by the ends of the beater to feed toward and fall upon spreader S. These side guards are hinged at their top on the sides of frame F and are adapted to be adjusted so as to be brought into a closer or wider relation as may be found desirable, and the means of adjustment in this instance are links or braces 18, provided with a series of holes and having pin 20 adapted to fasten them in one position or another as a given case may require. It will be noticed that there is no bottom or rear part whatever between the beater and the spreader so that this space is wide open for the fertilizer to fall and there is nothing to impede the dropping upon the spreader and no means of choking it as formerly, which I have found to be an important advantage in this construction over my original machine. Obviously, any suitable means of adjustment for said guards or fenders G may be employed, and such means may be located in an advantageous or available position.

The foregoing construction provides an attachment for a fertilizer spreading equipment comprising the spreader itself, the hood and side guards and sundry other parts, and the operation thereof is so light that it does not very materially increase the draft of the wagon and it will spread any fertilizing substance in a perfect manner from twice to ten times the width of distribution now possible and in such quantities as a particular kind of fertilizer may demand say all the way from two hundred pounds of commercial fertilizer and as low as one load of common barnyard manure to the acre, or I can increase the distribution per acre to any desired quantity.

What I claim is:—

1. A manure spreader adapted to operate by centrifugal action and consisting of a disk and radial vanes thereon fixed at their inner ends and adjustable at their outer ends.

2. A centrifugal fertilizer spreader provided with flexible vanes adjustable at their outer ends on the arc of a circle and rigidly secured at their inner ends.

3. A reversible disk shaped fertilizer spreader having vanes on both sides adapted to be bent between their ends and adjustable at their outer ends on the arc of a circle.

In testimony whereof I sign this specification in the presence of two witnesses.

GLEN G. GRISWOLD.

Witnesses:
W. W. ADLARD,
THOMAS E. CRUM.